United States Patent [19]
Kerr, Jr.

[11] Patent Number: 5,762,223
[45] Date of Patent: Jun. 9, 1998

[54] ELECTRICAL BOX FOR CEILING FAN SUPPORT

[75] Inventor: Jack R. Kerr, Jr., College Station, Tex.

[73] Assignee: Fan Tex, Inc., College Station, Tex.

[21] Appl. No.: 902,906

[22] Filed: Jul. 29, 1997

Related U.S. Application Data

[63] Continuation of Ser. No. 168,755, Dec. 16, 1993, abandoned.

[51] Int. Cl.$^6$ ............................................. H02G 3/08
[52] U.S. Cl. ................................... 220/3.9; 220/3.3
[58] Field of Search ........................ 220/3.4, 3.3, 3.5, 220/3.7, 3.9, 3.52, 3.54

[56] References Cited

U.S. PATENT DOCUMENTS

| | | | |
|---|---|---|---|
| 3,846,604 | 11/1974 | Shallbetter | 220/3.3 |
| 3,913,773 | 10/1975 | Copp et al. | 220/3.3 |
| 4,140,293 | 2/1979 | Hansen | 220/3.9 |
| 4,399,922 | 8/1983 | Horsley | 220/3.3 |
| 4,403,708 | 9/1983 | Smolik | 220/3.9 |
| 4,483,453 | 11/1984 | Smolik | 220/3.9 |
| 4,572,391 | 2/1986 | Medlin | 220/3.3 |
| 4,688,693 | 8/1987 | Medlin, Jr. | 220/3.3 |
| 5,234,119 | 8/1993 | Jorgensen et al. | 220/3.9 |

*Primary Examiner*—Joseph M. Moy
*Attorney, Agent, or Firm*—Daniel Rubin

[57] ABSTRACT

An electrical junction box to be used when supporting a relatively heavy hanging load from the underside of a joist/beam at an installation site. In one embodiment a slotted pancake dish internally supports an arcuately displaceable bracket both of which have coincident slots through which to receive fasteners by which the load is to be supported. A removably disposed lead box in which electrical leads are received extends normally upright to the plane of the pancake dish and is adapted to he positioned thereon off center in communication with an opening through the dish. A partially circular shell section can optionally be utilized by being removably secured on the pancake dish opposite the lead box so as to cooperate with the lead box when utilized in forming an externally appearing cylindrical canister-like configuration. A second bracket vertically depending within the sleeve of the shell section is securable at its top portion to a joist/beam and at its lower portion receives the pancake dish and load via bolts secured thereto. The second bracket provides for angular adjustment so as to compensatingly accommodate various beam pitches. Indicia along the exterior of the shell provides guidance in cuttingly removing portions of the shell in correlation to the pitch of the beam in order to receive the beam intervening between the shell and lead box while affording axially vertical orientation of the cylinder. In another embodiment, a pancake dish and electrical lead box are integrally joined as a unit for direct joist mounting or can be utilized with the second bracket as before. An optional horizontal support plate is disclosed for use in combination with the second bracket for supporting the load.

19 Claims, 7 Drawing Sheets

ELECTRICAL BOX FOR CEILING FAN SUPPORT

This application is a continuation of application No. 08/168,755, filed Dec. 16, 1993, now abandoned.

FIELD OF THE INVENTION

The field of art to which the invention pertains comprises the art of support structures by which to hang relatively heavy units such as ceiling fans, light fixtures, etc. from the underside of either a ceiling joist or beam commonly associated with cathedral type ceilings.

BACKGROUND OF THE INVENTION

Ceiling fans typically represent a dynamic load of about 25 lbs. to 100 lbs. In new building construction or in existing building construction where wood joists or studs are completely exposed and readily accessible, providing additional structural support at the mounting site of a ceiling fan or a relatively heavy light fixture can be readily effected by well known forms of brackets, bracing, etc. However, for ceiling mounting of these items in existing building structures without ready access to the studs or joist, installation becomes considerably more difficult. Where it is desired to hang the fixture from a sloping central joist or beam such as contained in a cathedral ceiling or even a horizontal joist or beam from which the ceiling slopes away, problems can be associated therewith rendering the installation difficult, costly and/or unsightly. Providing a neat and tidy installation for supporting a fan beneath a cathedral ceiling has commonly resorted to a custom fabrication at the site of the installation.

BACKGROUND OF THE PRIOR ART

Various devices have been proposed for interjoist hanger support that can be installed through a four inch opening normally provided in a ceiling for an electrical outlet box. Exemplifying such devices are the disclosures of U.S. Pat. Nos. 2,140,861; 3,518,421; 4,405,111; 4,463,923; and my own prior patent 4,909,405. A support hanger specifically intended for use with drop ceilings is commercially marketed under the trademark QUIK DROP. A saddle type junction box for direct joist mounting is marketed by Raco Inc. of South Bend Indiana.

The foregoing while generally suitable for their intended purposes, are limited and not suitably satisfactory for use with cathedral ceilings having a sloping ceiling or a sloping joist or beam centrally located superposed on the ceiling. Efforts to mount ceiling fans an cathedral ceilings have proved difficult, expensive and unsightly.

OBJECTS OF THE INVENTION

It is an object of the invention to provide a novel electrical junction box adapted for use with supporting a ceiling fan or other heavy object from a central ceiling joist and/or beam of a cathedral ceiling.

It is a further object of the invention to effect the previous object with an electrical junction box affording versatility and ready adaptation to the unique installation conditions associated with the construction of a cathedral type ceiling.

It is a still further object of the invention to effect the previous objects with an electrical junction box affording enhanced rigidity in resisting vibration and the dynamic loading potentially imposed by a supported ceiling fan.

SUMMARY OF THE INVENTION

The invention relates to a novel electrical junction box for use with supporting a relatively heavy hanging load from the underside of a joist or beam associated with the construction of a cathedral type ceiling. More specifically, the invention relates to such an electrical junction box having a prefabricated construction affording flexibility, versatility and an aesthetically pleasing appearance in adapting the fan mount to a variety of different construction variations commonly associated with cathedral type ceilings. Unlike the custom fabrication previously resorted to for such purposes, the electrical junction box hereof can be readily installed quickly and easily by one workman on site.

The foregoing is achieved in accordance with the invention by embodiments readily adapted for use with a horizontal joist or center beam where the adjacent ceiling slopes transversely away therefrom or where the ceiling and center beam are commonly sloped together. For either application, the majority of components are of injection molded plastic composition utilizing polymers such as PVC, Valox™, or Fiberglass.

A first embodiment is comprised of three separable components that can be utilized together as a unit or separable to accommodate on-site conditions. Comprising this embodiment is an annular dish like pancake box internally containing an arcuately displaceable bracket. The dish and bracket are capable when used as a unit to function as a shallow pancake box in which to receive the electrical leads for connection to the fan. Both the dish and bracket are adapted to be secured together along with a load hanger directly to the underside of the central beam. The fan, when installed, will be secured via screws extending into the joist or beam directly through both the bracket and pancake.

With the bracket being rotatable, the unit is readily adapted to accommodate an add-on wiring compartment to supplement the capacity of the pancake box. The optional wiring compartment in the form of a vertically hollow side box having a flat face for placement against the side face of the beam/joist and a segmented circular section can be fitted removably disposed upright on the dish. Use of the side box provides lateral stabilization to the unit and when utilized is adapted to receive and contain additional electrical leads to which the fan is to be connected. Where a duct or other obstruction is encountered adjacent the beam as would interfere with use of the side box, it can be readily eliminated permitting the pancake dish with its internal bracket to be utilized alone as a unit.

A second embodiment hereof is utilized where the beam and/or ceiling angularly slope together as to require a dependent spacer for the load to be hung through and beneath the ceiling from the underside of the beam. Comprising the second embodiment is the first embodiment combined with a partially circular tubular sleeve or shell fitted upright onto the dish of the first embodiment opposite the side box. The sleeve complements the side box to form therewith an outwardly appearing canister-like cylindical configuration. The assembly is adaptable, when necessary, to partially saddle fit onto a sloping beam by precutting the sleeve to remove a predetermined portion correlated to complement the angle of the beam. A vertically disposed angularly adjustable bracket internally of the sleeve effects a horizontal base for the pancake and bracket of the first embodiment while affording a vertical axis for the cylinder.

Indicia on the sleeve provide guidance for effecting the required cutting pattern in accommodating the various ceiling pitches normally encountered. Once installation has been completed, the cylindrically appearing portion of the box depending exposed below the ceiling can be readily painted to suit.

In yet another embodiment, an annular dish-like pancake box and a vertically hollow wiring compartment are integrally joined as a unit adapted for direct joist mounting. By means of a load bearing plate and an adjustable bracket, the unit can be utilized dependent mounting in the manner of the second embodiment.

The features and advantages of the invention will be appreciated by those skilled in the art upon reading the detailed description which follows in conjunction with the drawings.

DESCRIPTION OF THE PREFERRED EMBODIMENT

In the description which follows, like parts are marked throughout the specification and drawings with the same reference numerals respectively. The drawing figures are not necessarily to scale and the proportions of certain parts may have been exaggerated for purposes of clarity.

Referring to FIGS. 1-6, a first embodiment of the electrical junction box of the invention designated 10 is utilized in association with the mounting of a ceiling fan 12 to the underside of a joist or center beam 14. Fan canopy 16 in this arrangement is positioned flush against the underside of ceiling 18.

Figures 2, 4, 5:
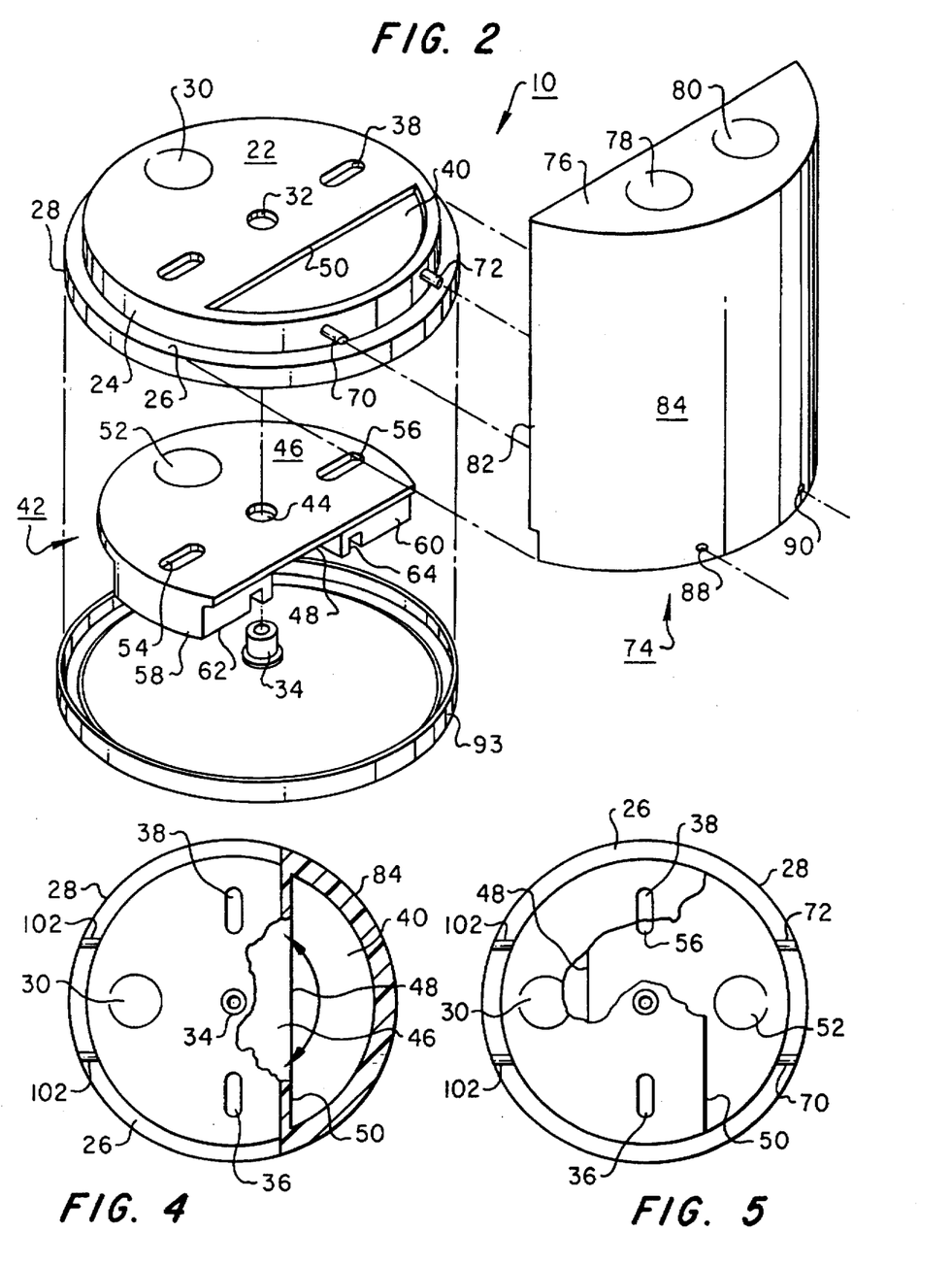
FIG. 2 is an exploded isometric view of the electrical box of FIG. 1.
FIG. 4 is a plan view partially sectioned as seen substantially along the lines 4—4 of FIG. 3.
FIG. 5 is a plan view similar to FIG. 4 with the internal bracket rotated for stand-alone pancake use.

Comprising the electrical junction box hereof is an annular dish-like pancake housing 20 having an upper surface 22 merging with a peripheral annular side wall 24. The latter, in turn, merges with an annular shoulder 26 extending to a lower annular concentric rim 28. Formed in surface 22 is a knockout 30, a center aperture 32 through which to receive tubular upset 34, spaced apart elongated mounting slots 36 and 38 and a segmented circular opening 40.

Adapted to be disposed internally for arcuate displacement within the pancake housing 20 is a bracket 42 supported on hub 34 penetrating upward through aperture 44. The top surface 46 of bracket 42 coincides substantially with the surface dimension of pancake surface 22 including an edge 48 that coincides generally with edge 50 of opening 40. Also disposed in surface 46 is a knockout 52 and open elongated slots 54 and 56 which when properly oriented can coincide in position with knockout 30 and slots 36 and 38 of pancake housing 20. The underside of surface 46 includes two integrally depending base units 58 and 60 extending to a planar undersurface 62 and through which the slots 54 and 56 extend. Formed in undersurface 62 is a pair of transversely extending narrow grooves 64 in which to store mounting screws 66 and 68 during shipment and until ready for use. For reasons as will be understood, bracket 42 can be oriented as shown in FIG. 4 so as to provide a common opening 40 or can be displaced 180 degrees as shown in FIG. 5 so as to close off the otherwise available opening and provide a pair of spaced apart knockouts 30 and 52.

Adapted to be secured interfitted onto the side of pancake housing 20 is a vertical, elongated and removable box 74 comprising a wiring compartment of segmented circular section to seat on shoulder 26 while communicating internally with opening 40. Dowels 70 and 72 can be used to effect the interfit. Alternatively, a bayonet mount or dovetail fit can be utilized for that purpose.

The side box 74 includes a top plate 76 having a pair of electrical knockouts 78 and 80, a generally flat upright front wall 82 and an arcuate side wall 84. Arcuate rim 86 is adapted to seat interfitted on pancake shoulder 26 via openings 88 and 90 through which to receive dowels 70 and 72 respectively. As will be understood, the use of box 84 is optional and when utilized provides a hollow interior chamber 92 in which to receive electrical leads (not shown) from a local power source through knockout openings 78 and/or 80. A removable plastic cover 93 can be utilized after installation to protect the underside of bracket 42 during application of the surrounding sheet rock and painting.

Figure 1:
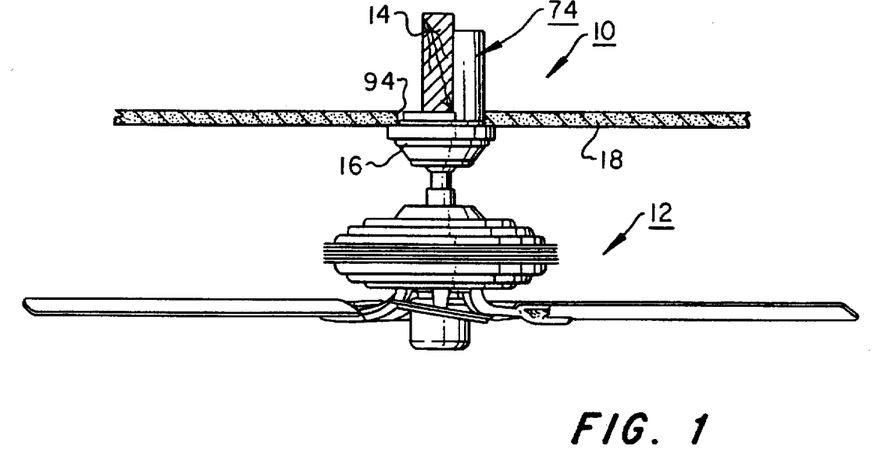
FIG. 1 an elevational view of a ceiling fan installation on a flat ceiling utilizing the first embodiment of the electrical box of the invention.
Figure 3:
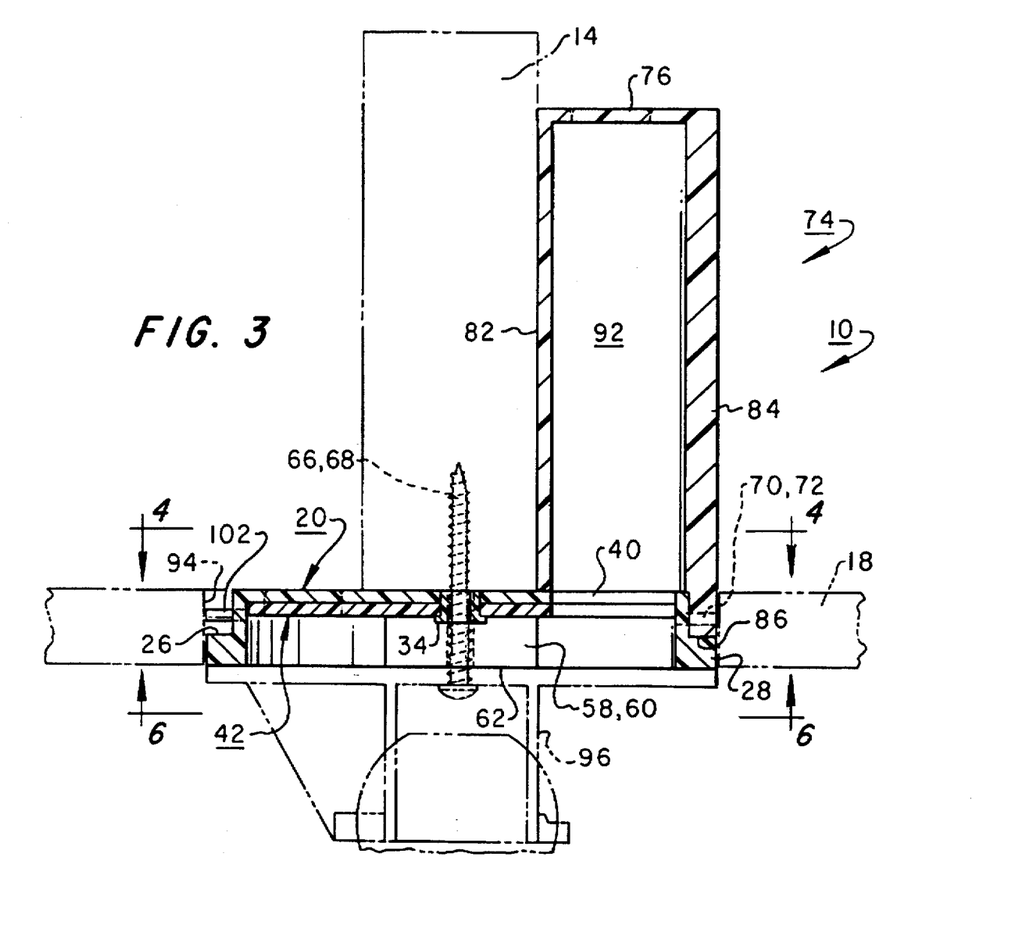
FIG. 3 is a fragmentary enlarged sectional elevation of the electrical box of FIG. 1.
Figure 6:
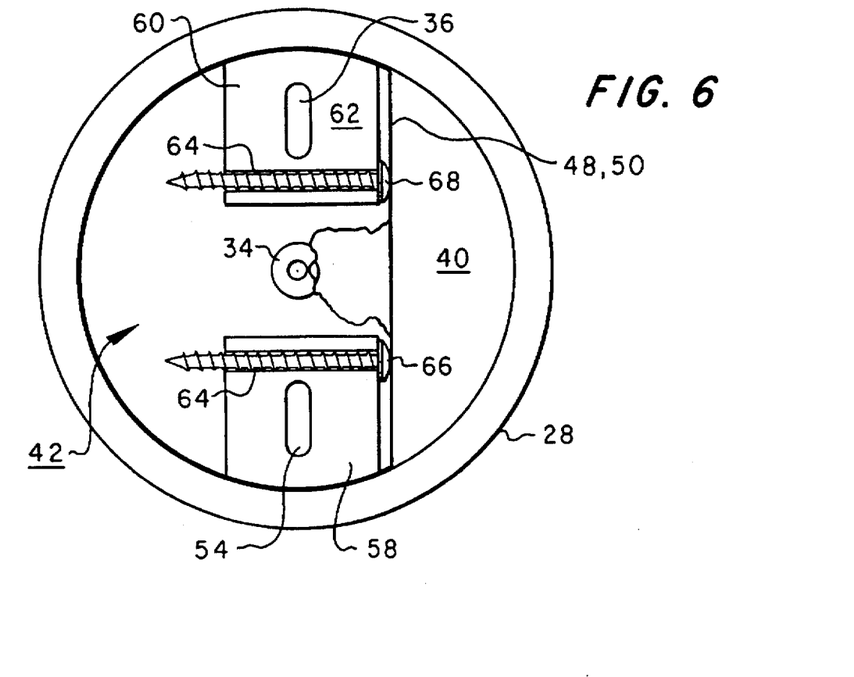
FIG. 6 is an underside plan view as seen substantially along the lines 6—6 of FIG. 3.
Figure 7:
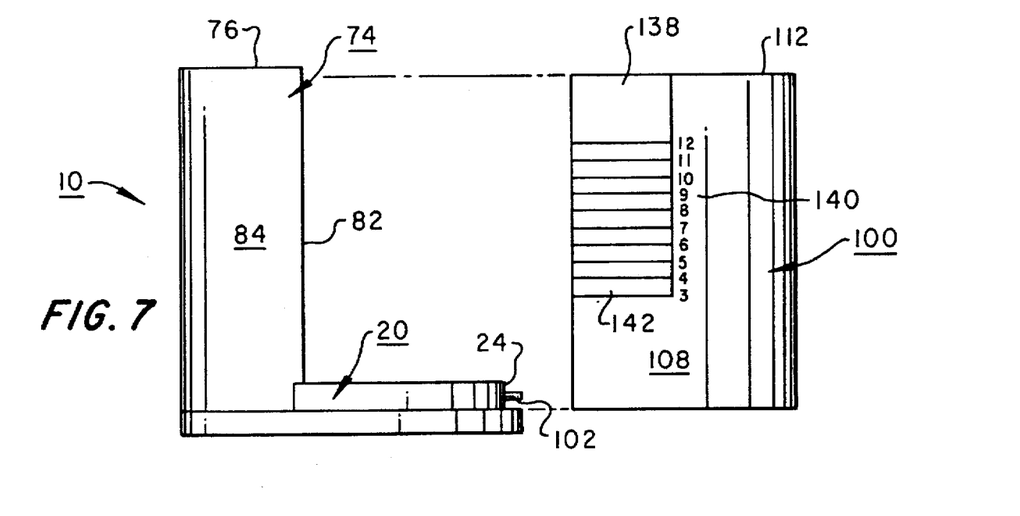
FIG. 7 is an exploded elevation view of the second embodiment of the electrical junction box hereof.

As thus far described, assembled pancake housing 20, bracket 42 and side box 74 can be utilized as a unit as shown in the installations illustrated in FIGS. 1 and 3 after first forming an opening 94 in ceiling 18. For these installations and with cover 93 removed, a hanger bracket 96, normally provided by the fan manufacturer, is mounted against undersurface 62 together with electrical box 10. Screws 66 and 68 extending into the underside of joist or beam 14 through the apertures (not shown) of the hanger bracket 42 and the aligned slots of the pancake housing 20 secure the items in place. Front face 82 of side box 74 seats laterally flush against the side face of the joist while bracket 42 is oriented in the manner of FIG. 4 so as to define an opening 40 communicating internally of box chamber 92.

Should an obstruction be encountered along the side of joist 14 as would interfere with the placement of box 74, such as a duct, pipe, light, or other of a variety of items commonly placed in the ceiling space, box 74 can be readily removed from the unit enabling pancake housing 20 and bracket 42 to be utilized alone as a unit. When this occurs, bracket 42 is arcuately displaced from the orientation of FIG. 4 to the orientation of FIG. 5 thereby closing opening 40. In either event, the hanger bracket 96 seats against the underside of spaced surfaces 62 while affording the flush mounting of a hanger bracket thereagainst. For mounting ceiling fans manufactured by the Hunter Fan Company of Memphis Tennessee, a U-shaped hanger bracket 98 (FIG. 12) supplied by the manufacturer is frequently substituted for hanger 96 in any of the foregoing.

The second embodiment hereof to accommodate a sloping beam or ceiling as will now be described specifically with reference to FIGS. 7–12, utilizes the first embodiment 10 hereof in combination with an elongated arcuate sleeve segment 100 of like length and diametral dimension as box 74. A pair of spaced apart dowels 102 laterally extending from annular surface 24 are adapted to receive and support sleeve 100 on shoulder 26. A bayonet lock or dovetail interfit could be used in place of the dowels. In this arrangement the vertical edge faces 104 and 106 (FIG. 11) of arcuate wall 108 engage the front wall 82 of side box 74 so as to cooperate therewith in providing an anesthetically pleasing cylindrical canister-like appearance for the assembly. When rim 110 is positioned on dowels 102 interfit on shoulder step 26, top surface 112 is generally co-planar with the top surface 76 of side box 74 while a vertically open internal cavity 114 is defined therein.

Figure 8:
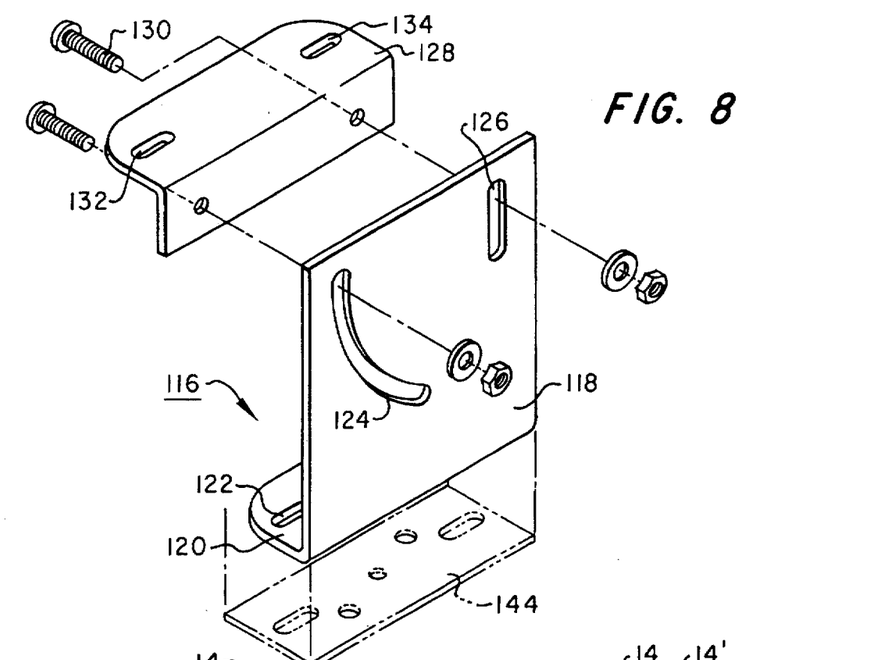
FIG. 8 is an exploded isometric view of an adjustable bracket utilized internally of the electrical box construction of FIG. 7.

In order to mount the second embodiment hereof with arcuate sleeve 100 in place, there is utilized an adjustable angle bracket 116 as best seen in FIG. 8. The bracket is comprised of a vertical metal plate 118 of about 18 gauge or less having a stationary offset lower angle base 120 containing elongated slots 122 (one shown) adapted to coincide with the slots 36 and 38 of pancake housing 20. Defined through plate 118 is an arcuate slot 124 and a vertical slot 126 by which to mount an angularly adjustable upper angle base 128 via screws and nuts 130.

Figure 9:
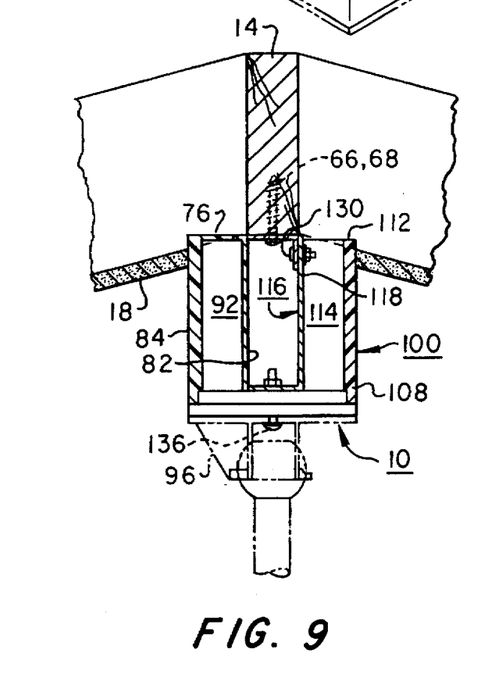
FIGS. 9 and 10 are sectional elevations of installations utilizing the second electrical box embodiment hereof.
Figure 10:
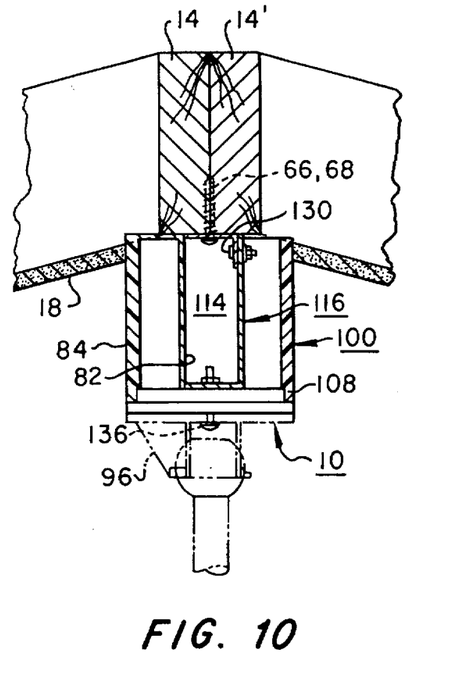

As best seen in FIGS. 9 and 10, bracket 116 is secured to joist 14 via screws 66 and 68 extending through upper slots 132 and 134 of upper base 128 into the underside of joist 14 of FIG. 9 or into the underside of double joists 14 and 14' of FIG. 10. The junction box unit 10 and fan hanger bracket 96 or 98 are then secured via nuts and bolts 136 extending through the pancake slots and slots 122 of lower angle base 120. Where preferred, a support plate 144 may optionally be utilized in combination therewith in a manner described below.

Figure 11:
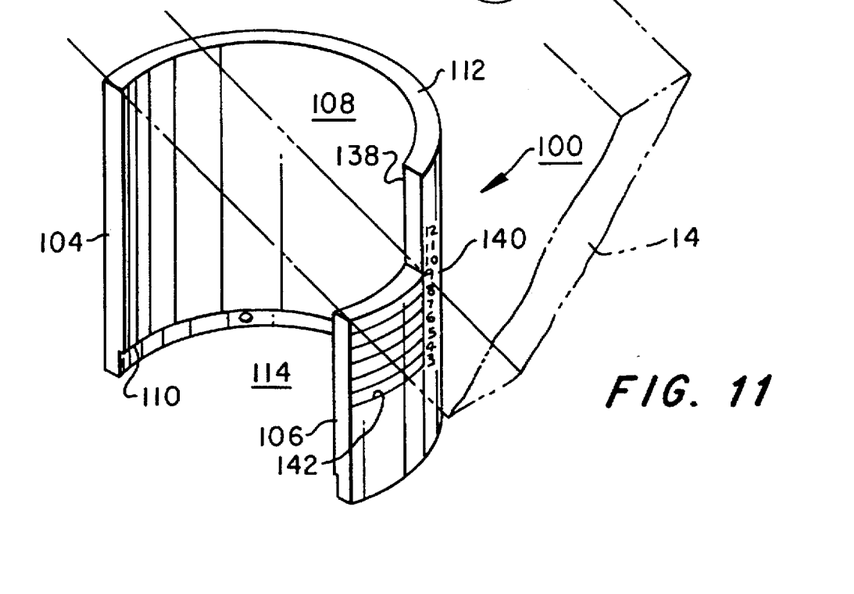
FIG. 11 is an isometric view illustrating the manner of modifying the sleeve portion of the second embodiment hereof to accommodate an encountered beam pitch.
Figure 12:
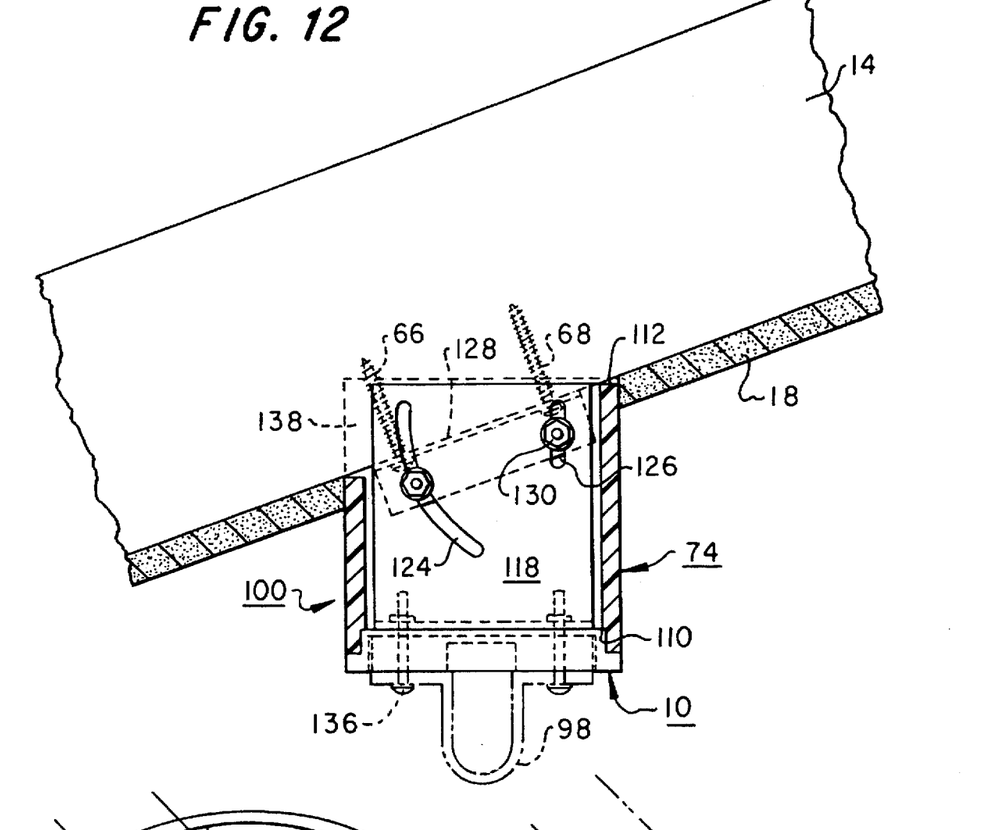
FIG. 12 is a sectional elevation of an installation of the second embodiment onto a sloping beam.

For the installation of FIG. 12 in which the ceiling 18 is secured to the underside of a sloping beam 14, sleeve 100 can be cut to remove a segment 138 from the edge 106 in order to cooperate with box face 82 for essentially straddling the beam portion thereat. For that purpose, the sidewall portion 108 of sleeve 100 extending inward from edge 106 includes a vertical list of indicia graduations 140 providing guidance for the depth of cut and the extent of segment 138 to be removed. That is, the graduations 140 and corresponding horizontal indicia lines 142 thereat are correlated to the various beam pitches such that as illustrated in FIG. 11, cutaway 138 extends to graduation "9" to accommodate a beam pitch of 9 on 12. Angle base 128 is then angularly set via slot 124 and the pivot axis of slot 126 to complement the pitch angle. This affords the assembly a vertical axis partially straddling the beam 14. Fan hanger 96 or fan hanger 98 can then be installed to the underside of the bracket base 120 within the cylindrical assembly as before.

Figures 13, 14, 15:
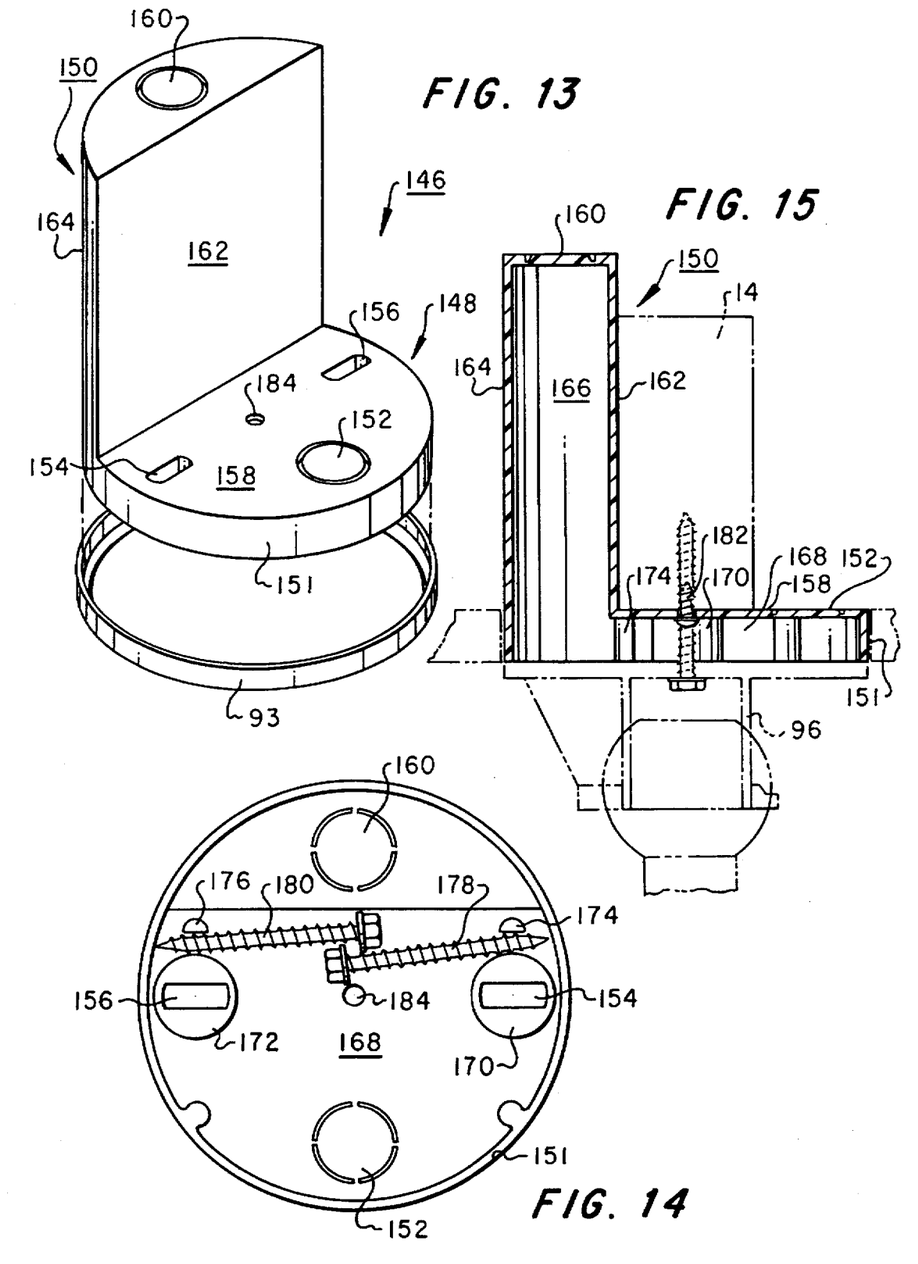
FIG. 13 is an isometric view of the third embodiment of the electrical junction box hereof.
FIG. 14, is a bottom plan view of the embodiment of FIG. 13.
FIG. 15, is a sectional elevation through the embodiment of FIG. 13.

For the embodiment of FIGS. 13–15, the electrical junction box designated 146 is comprised of an integral L-shaped configuration including pancake housing 148 and an upright wire compartment side box 150. The housing includes an apron 151, a knockout 152, and spaced slots 154 and 156 in surface 158. The side box includes a top knockout 160 and a vertical front mounting face 162 with arcuate shell 164 defining an internal cavity 166. Within housing cavity 168, an annular vertical boss 170 surrounds slot 154 while a similar boss 172 surrounds slot 156. The bosses dependently terminate coplanar with the underplane of apron 151 and cooperate with semi-circular dependent posts 174 and 176 to securely store mounting screws 178 and 180 during shipment.

A screw 182 when extending through center aperture 184 can be utilized to initially mount unit 146 to the underside of joist 14 (FIG. 15) while removable plastic cover 93 serves to internally protect the housing as described supra. With cover 93 removed, installation of fan bracket 96 is effected by screws 178 and 180 extending through slots 154 and 156 directly into joist 14.

Figure 16:
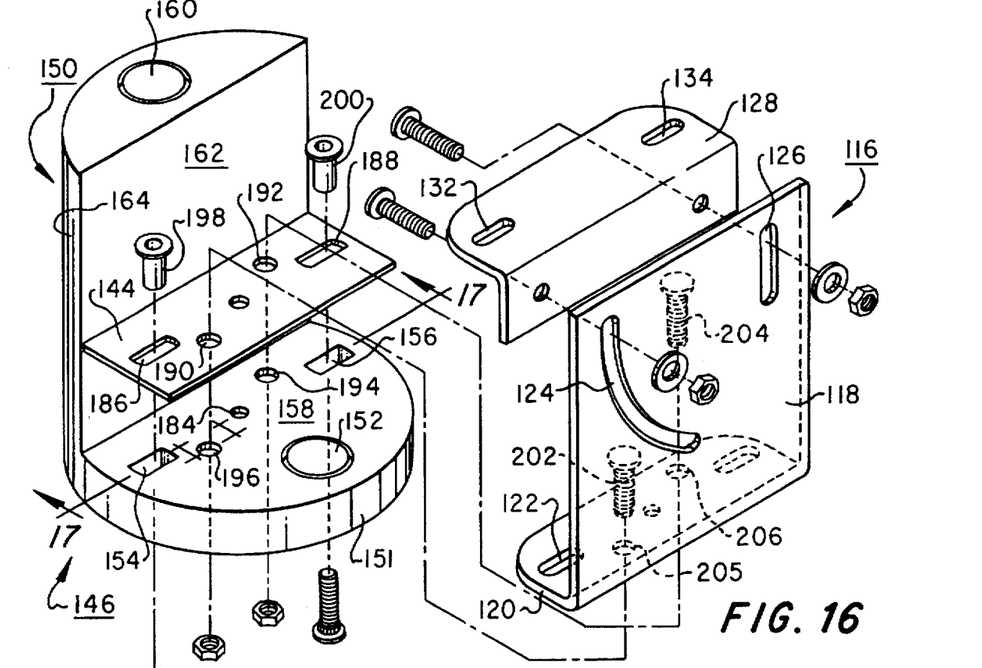
FIG. 16, is an isometric exploded view for modifying the third embodiment to accommodate a dependent mounting.
Figure 17:
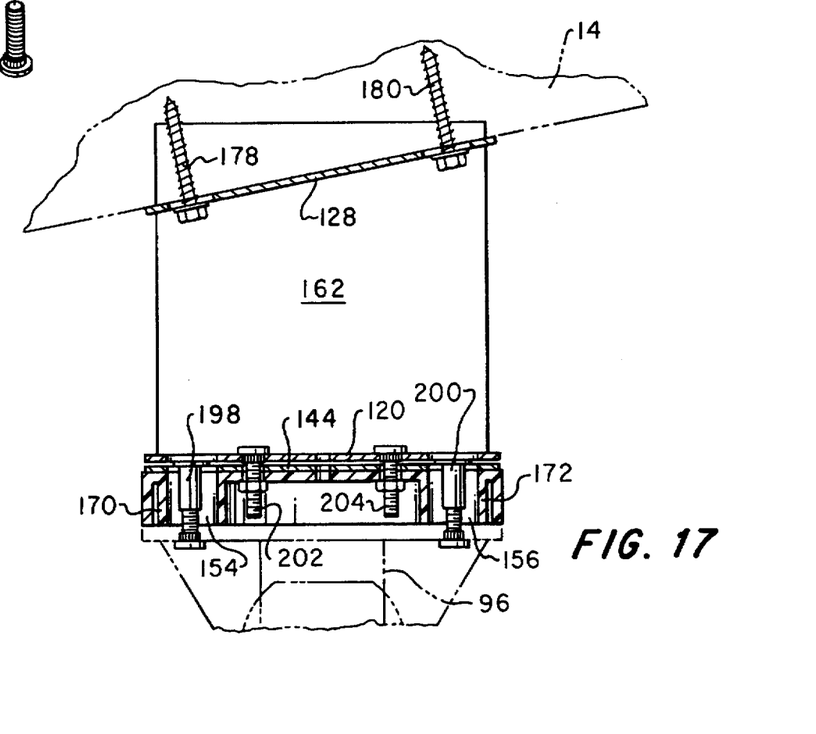
FIG. 17, is a sectional elevation as seen substantially along the lines 17—17 of FIG. 16.

To accommodate a sloping beam or ceiling, adjustable bracket 116 can be utilized therewith in the manner illustrated in FIGS. 16 and 17 for installation similarly as above. For these purposes a sleeve 100, adapted to interfit with a box unit 146, is utilized in combination therewith for providing an aesthetially pleasing cylindrical appearance.

Optionally in these circumstances, a support plate 144 can be utilized having slots 186 and 188 coinciding in location with pancake slots 154 and 156. Likewise, apertures 190 and 192 coincide in location with apertures 194 and 196 provided in housing surface 158. When using support plate 144, weld nuts 198 and 200 are positioned in slots 186 and 188 to secure a fan bracket 96 directly onto the junction box. Screws 202 and 204 extending through bracket apertures 205 and 206 then secure bracket base 120 to the support plate. Upper bracket base 128 secures the bracket 116 to beam 14 as before. In this relation, the load on fan bracket 96 is carried by box 146 to be conducted in series via support plate 144 to bracket 116.

By the above description there is disclosed a novel electrical box for use with ceiling fans or other heavy objects to be supportively hung from a joist or beam. It is constructed of prefabricated components affording an asthetically pleasing appearance when exposed on installations such as a cathedral ceiling. The expense associated with such installations is substantially reduced as compared to the custom installations previously utilized under such circumstances, largely attributed to the reduction in labor cost associated therewith. The advantages therefor are immense in satisfying a long felt need in the industry in affording a convenient installation for ceiling fans or the like beneath a cathedral ceiling.

Since many changes could be made in the above construction and many apparently widely different embodiments of this invention could be made without departing from the scope thereof, it is intended that matter contained in the drawings and specification shall be interpeted as illustrative and not in a limiting sense.

I claim:

1. An electrical junction box for use with hanging a heavy object from a joist/beam in a ceiling area, comprising a junction box formed of a pancake dish having an upper wall and a shallow side wall, and a bracket internally mounted for arcuate displacement within said pancake dish in a generally parallel underlying relation to said upper wall, said pancake dish and said bracket having matching apertures through which to receive fasteners for securing a load to be hung from beneath said side wall onto a joist/beam at the site of installation; and said pancake dish includes an opening extending through the upper wall thereof at an off-center location while said bracket is arcuately displaceable between a first position maintaining said opening in said pancake dish and a second position closing said opening in said pancake dish.

2. An electrical box in accordance with claim 1 including an electrical lead box in which to receive power leads and removably mountable onto said pancake dish in an internally communicating overlying relation to said opening and extending upstanding generally normal to the plane of said pancake dish.

3. An electrical box in accordance with claim 2 in which said pancake dish is of a circular configuration and said lead box is of a segmented circular section including a substantially planar wall surface extending upstanding generally normal to the plane of said pancake dish.

4. An electrical box in accordance with claim 2 including a partial sleeve arcuate wall section removably mountable onto said pancake dish and disposed when mounted opposite said lead box to cooperate with said lead box in providing a unitary cylindrical configuration upstanding from said pancake dish.

5. An electrical box in accordance with claim 4 including a second bracket adapted to vertically depend within said partial sleeve and comprising an elongated main plate adapted for vertical orientation within said sleeve, an upper plate secured to said main plate laterally offset from the plane thereof and including apertures through which to receive fasteners for securing the second bracket to a joist/beam at an installation site and a lower plate secured to the main plate laterally offset from the plane thereof for position placement to receive a load hanger and said pancake dish and including apertures in a matched location with the apertures of said pancake dish for receiving fasteners for securing a load to be hung.

6. An electrical box in accordance with claim 5 in which one of said upper plate or said lower plate is presettably adjustable to complement the angle of a joist/beam to which the second bracket is to be secured so as to afford a substantially vertical orientation of the cylindrically appearing unit when installed.

7. An electrical box in accordance with claim 6 in which said partial sleeve is of a polymer composition and from which removal of a predetermined selected portion enables receipt of an angled beam therein.

8. An electrical box in accordance with claim 7 in which said partial sleeve includes indicia on a surface thereof correlated to a removal portion for a range of different beam pitches and from which the selected portion to be removed is identified for a pitch angle of an encountered beam.

9. An electrical box in accordance with claim 2 in which at least said pancake dish and said lead box are of a polymer composition.

10. An electrical junction box for use with hanging a heavy object from a joist/beam in a ceiling area, comprising a first junction box formed of a pancake dish having an upper wall and shallow side wall having a lower edge defining an underside plane, apertures in said upper wall through which to receive fasteners for securing a load to be hung from the underside plane of said side wall onto a joist/beam at the site of installation and a second junction box comprising an upstanding electrical lead box joined in a unitary relation to said pancake dish and together with said first junction box consisting essentially of an L-shaped configuration.

11. An electrical junction box in accordance with claim 10 in which said electrical lead box has a vertical flat surface facing toward said pancake dish at the location where joined and extending generally normal to the surface plane of said pancake dish.

12. An electrical box in accordance with claim 11 in which said pancake dish is of partially circular configuration and said lead box is of a partially circular section complementing said pancake dish to together comprise a cylindrial unit defined about said pancake dish.

13. An electrical junction box for use with hanging a heavy object from a joist/beam in ceiling area, comprising a first junction box formed of a pancake dish including an upper wall and shallow side wall having a lower edge defining an underside plane, apertures in said upper wall through which to receive fasteners for securing a load to be hung from the underside plane of said side wall onto a joist/beam at the site of installation, a second junction box comprising an upstanding electrical lead box joined in a unitary relation to said pancake dish, and a bracket adapted to vertically depend between said pancake dish and a joist/beam from which a load is to be hung, said bracket comprising an elongated main plate adapted for vertical orientation, an upper plate secured to said main plate laterally offset from the plane thereof and including apertures through which to receive fasteners for securing the bracket to a joist/beam at an installation site and a lower plate secured to the main plate laterally offset from the plane thereof for position placement to receive a hung load from beneath said pancake dish and including apertures for receiving fasteners for securing a load to be hung.

14. An electrical box in accordance with claim 13 in which one of said upper plate or said lower plate is presettably adjustable to complement the angle of a joist/beam to which the bracket is to be secured so as to afford a substantially vertical orientation of the electrical box unit when installed.

15. An electrical box in accordance with claim 14 including a rigid support plate positioned on the surface of said upper wall and the load to be hung is adapted to be secured through said pancake box to said support plate and the lower plate of said bracket is adapted to be secured to said support plate.

16. An electrical box in accordance with claim 14 including a partial sleeve arcuate wall section removably mountable onto said pancake dish and disposed when mounted opposite said lead box to cooperate with said lead box in providing a unitary cylindrical configuration upstanding from said pancake dish while concealing said bracket from view from beneath said pancake dish.

17. An electrical box in accordance with claim 16 in which said partial sleeve is of a polymer composition and from which removal of a predetermined selected portion enables receipt of an angled beam therein.

18. An electrical box in accordance with claim 17 in which said partial sleeve includes indicia on a surface thereof correlated to a removal portion for a range of different beam pitches and from which the selected portion to be removed is identified for a pitch angle of an encountered beam.

19. An electrical box in accordance with claim 14 in which at least said pancake dish and said lead box are of a polymer composition.

* * * * *